United States Patent
Bonnett et al.

[11] Patent Number: 5,845,387
[45] Date of Patent: *Dec. 8, 1998

[54] AUTOMOTIVE MULTI-PANEL COMPARTMENT AND METHOD FOR MAKING SAME

[75] Inventors: Roy E. Bonnett, Bloomfield; Ronald A. Carpenter, Dearborn, both of Mich.

[73] Assignee: Ford Global Technologies, Inc., Dearborn, Mich.

[ * ] Notice: The term of this patent shall not extend beyond the expiration date of Pat. No. 5,642,563.

[21] Appl. No.: 533,233

[22] Filed: Sep. 25, 1995

[51] Int. Cl.$^6$ .................................................... B21B 1/46
[52] U.S. Cl. .......................................................... 29/527.1
[58] Field of Search ................................... 29/527.1, 430, 29/458, 469.5, 771, 786, 787, 281.1, 281.4, 281.5, 429; 296/29, 185, 187, 193–195

[56] References Cited

U.S. PATENT DOCUMENTS

| | | | |
|---|---|---|---|
| 3,541,668 | 11/1970 | Wessells, III et al. | 296/193 |
| 4,836,600 | 6/1989 | Miyazaki et al. | |
| 4,968,087 | 11/1990 | Goria | |
| 4,991,282 | 2/1991 | Konig | 29/430 |
| 5,079,822 | 1/1992 | Arai et al. | 29/771 |
| 5,090,105 | 2/1992 | DeRees | |
| 5,092,649 | 3/1992 | Wurl | 296/185 |
| 5,155,690 | 10/1992 | Nomaru et al. | 29/430 |
| 5,191,707 | 3/1993 | Sasamoto et al. | |
| 5,199,156 | 4/1993 | Rossi | |
| 5,203,073 | 4/1993 | Kotake et al. | 29/771 |
| 5,209,541 | 5/1993 | Janotik | |
| 5,213,386 | 5/1993 | Janotik | 296/29 |
| 5,319,840 | 6/1994 | Yamamoto et al. | 29/430 |
| 5,362,120 | 11/1994 | Cornille, Jr. | 296/29 |
| 5,463,804 | 11/1995 | McCleary et al. | 29/469.5 |
| 5,642,563 | 7/1997 | Bonnett | 29/281.1 |

FOREIGN PATENT DOCUMENTS

| 227242 | 2/1958 | Australia | 296/29 |
|---|---|---|---|

*Primary Examiner*—Paula Bradley
*Assistant Examiner*—Katrina Davis
*Attorney, Agent, or Firm*—David B. Kelley

[57] ABSTRACT

A vehicle body has multiple panels adhesively bonded in spaced relationship without direct contact therebetween, the vehicle body constructed by presenting discrete body panels into an assembled position with respect to a single base for application of an adhesive thereon to secure the body panels together. The body panels, which include a pair of body side panels, a roof outer panel, a roof inner panel, and an underbody, have mating flanges along the peripheries thereof angled at between approximately 5° and 15° from a line perpendicular to a surface from which the flanges extend so as to reduce adhesive wipe-off between mating surfaces.

17 Claims, 11 Drawing Sheets

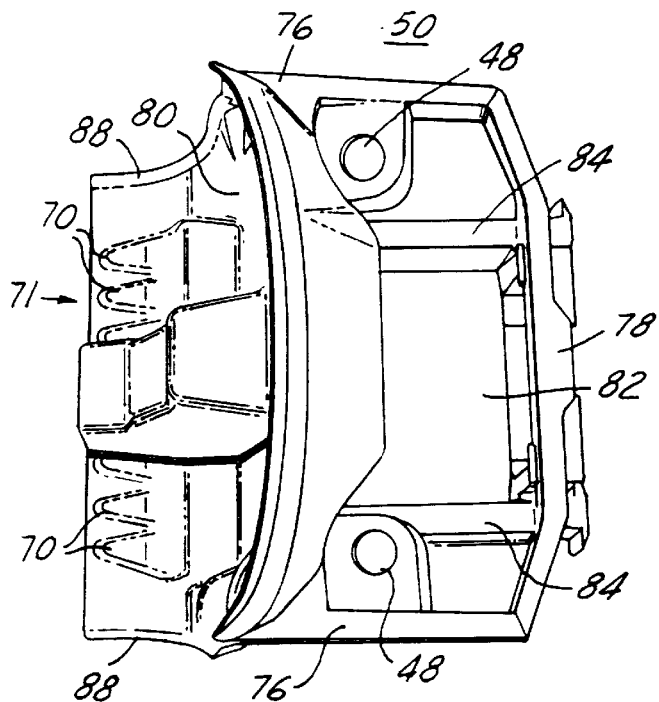
FIG.2
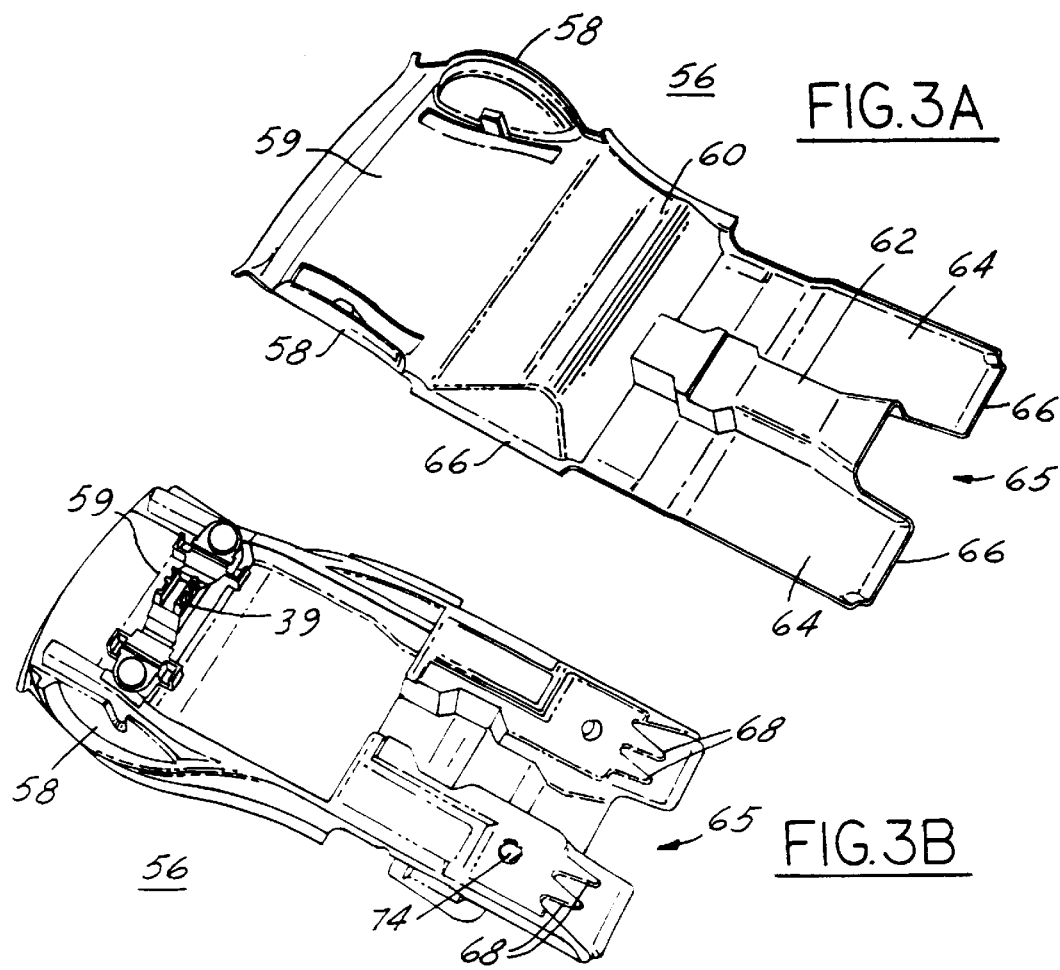
FIG.3A
FIG.3B

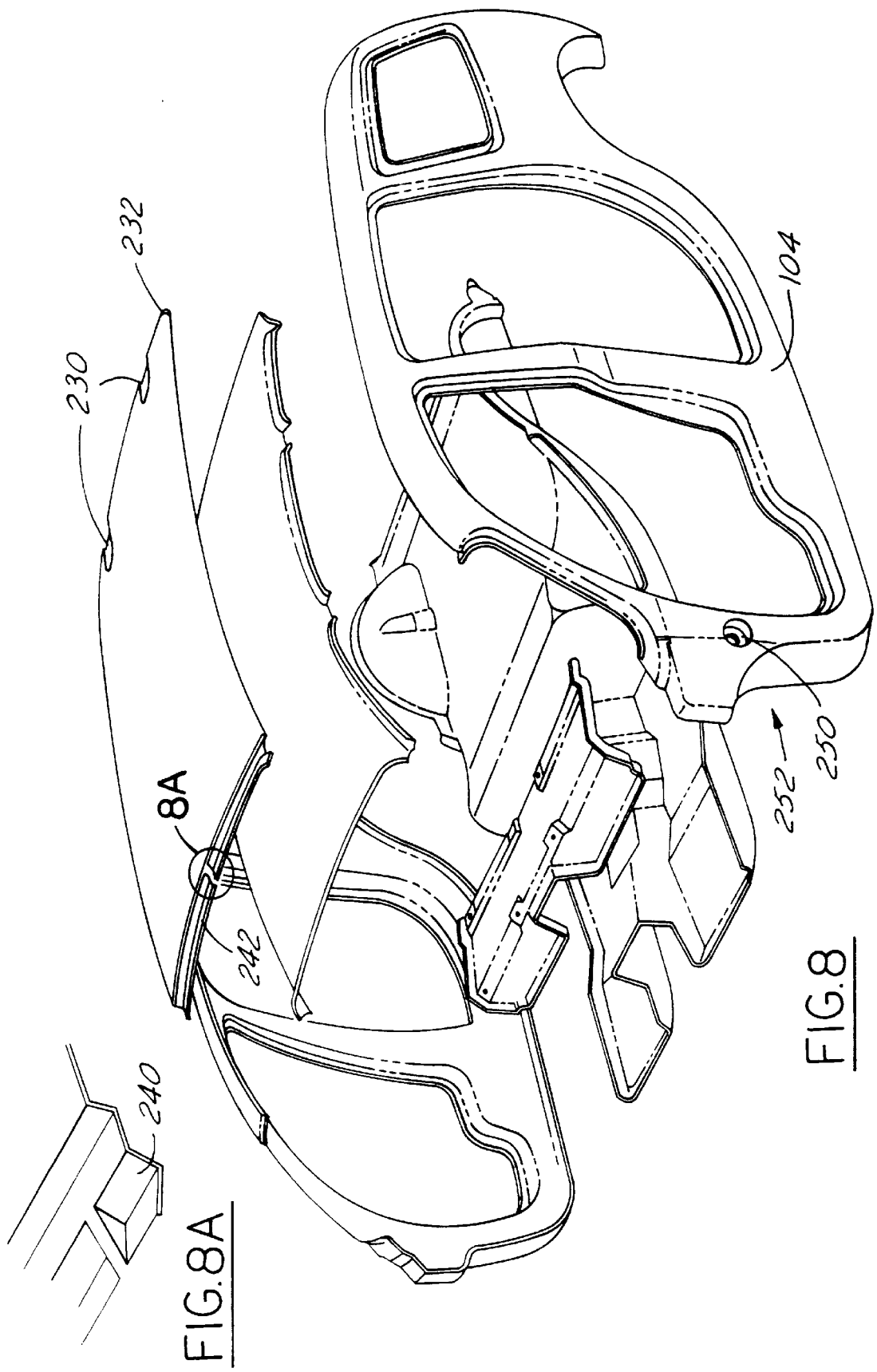

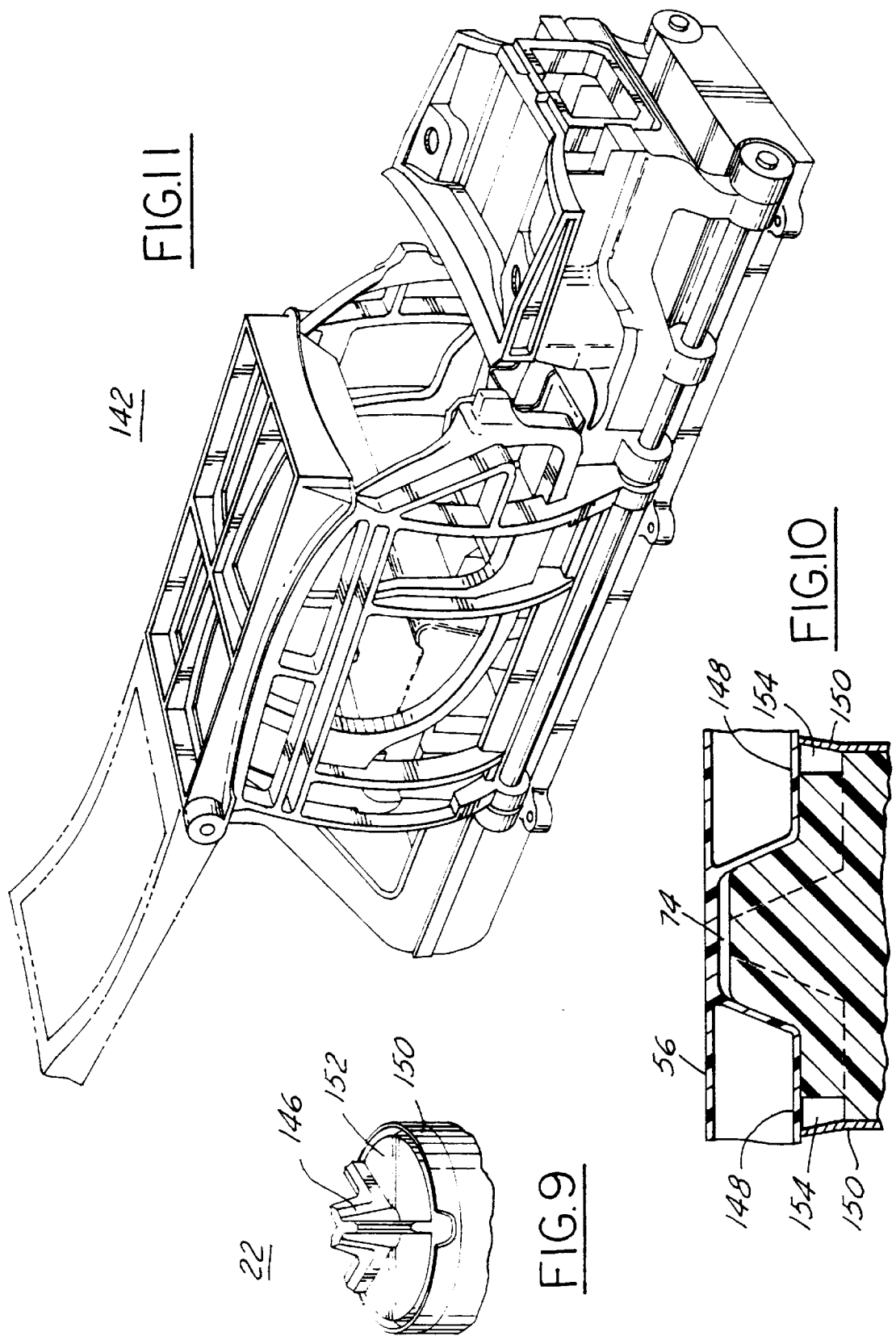

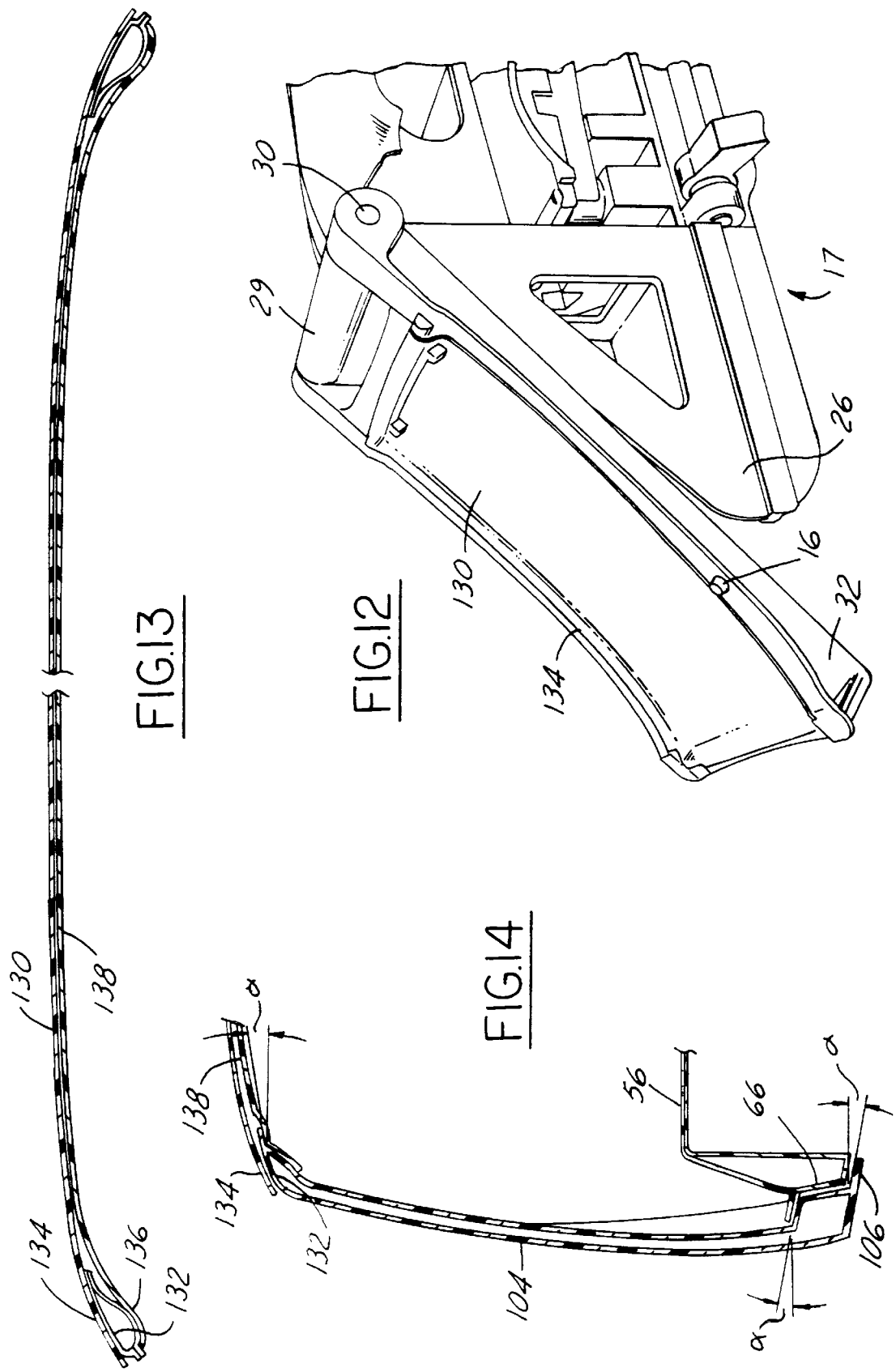

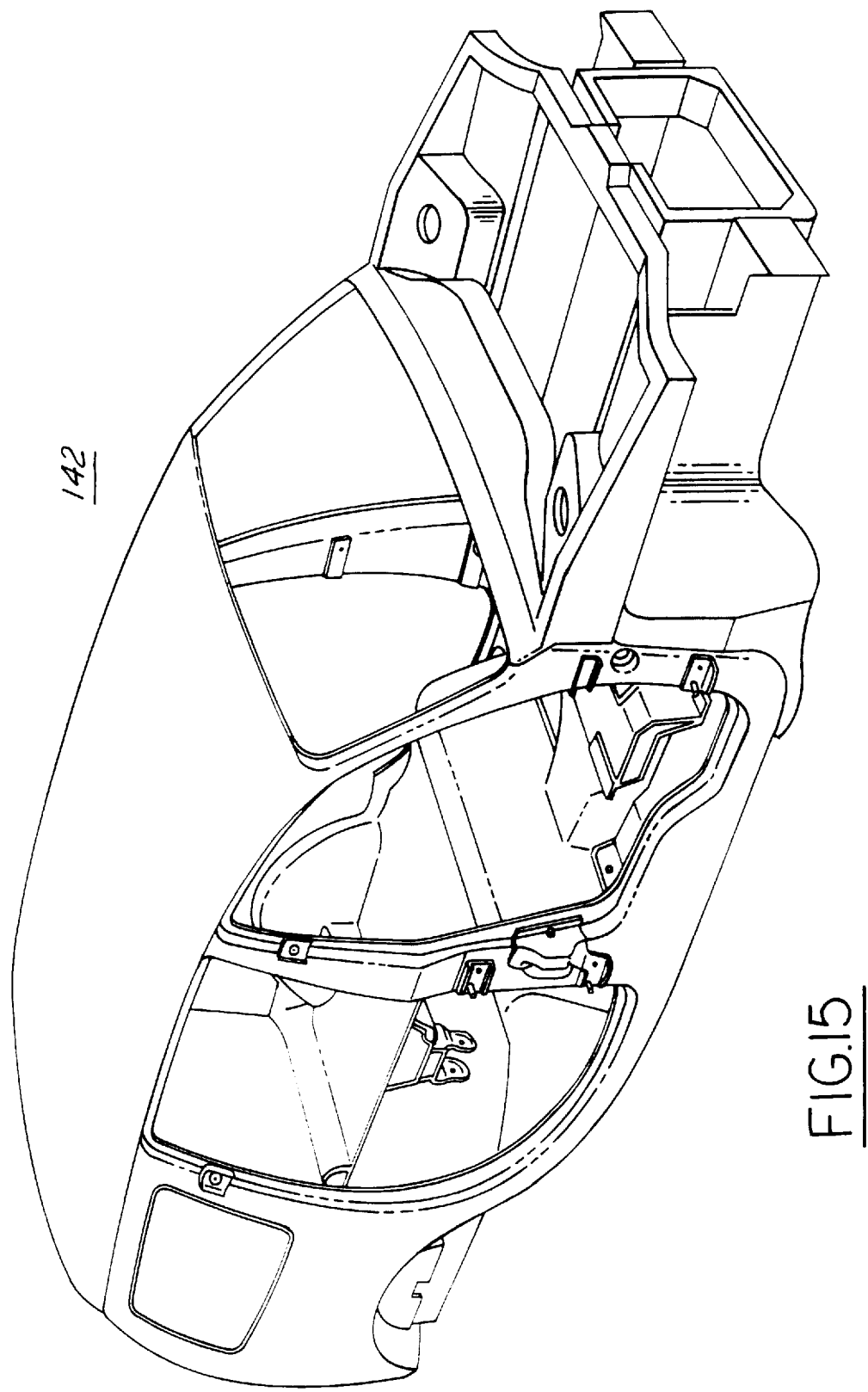

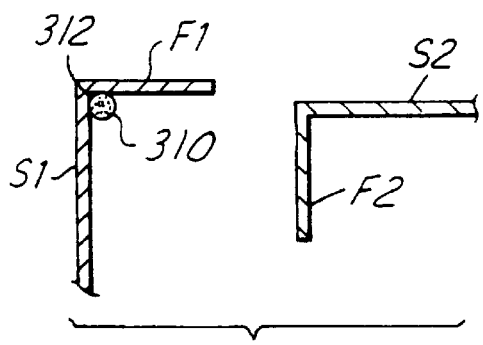 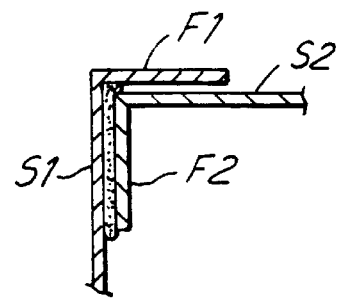
FIG.16A  FIG.16B
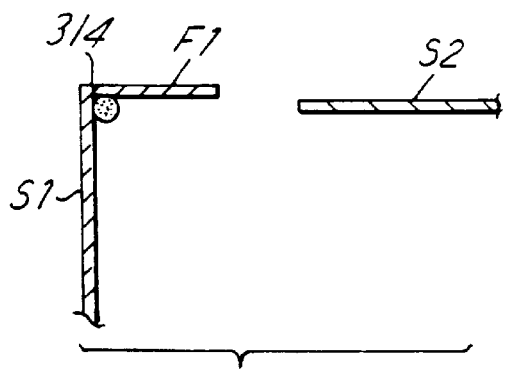 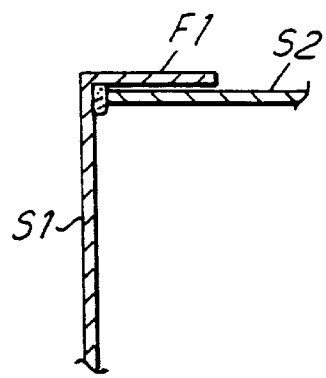
FIG.17A  FIG.17B
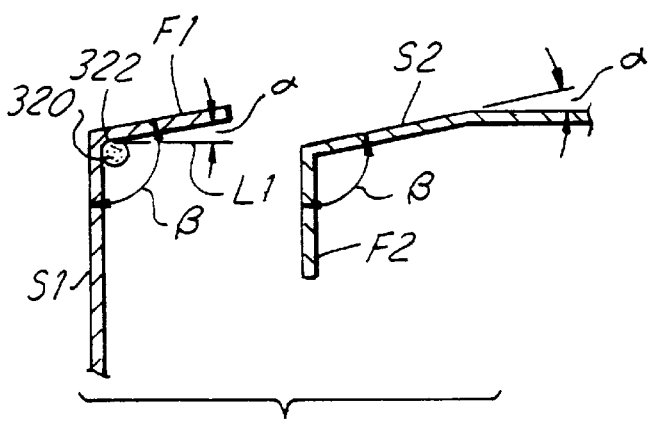 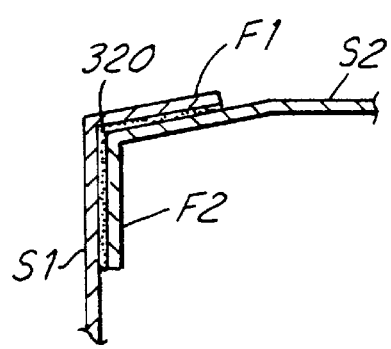
FIG.18A  FIG.18B

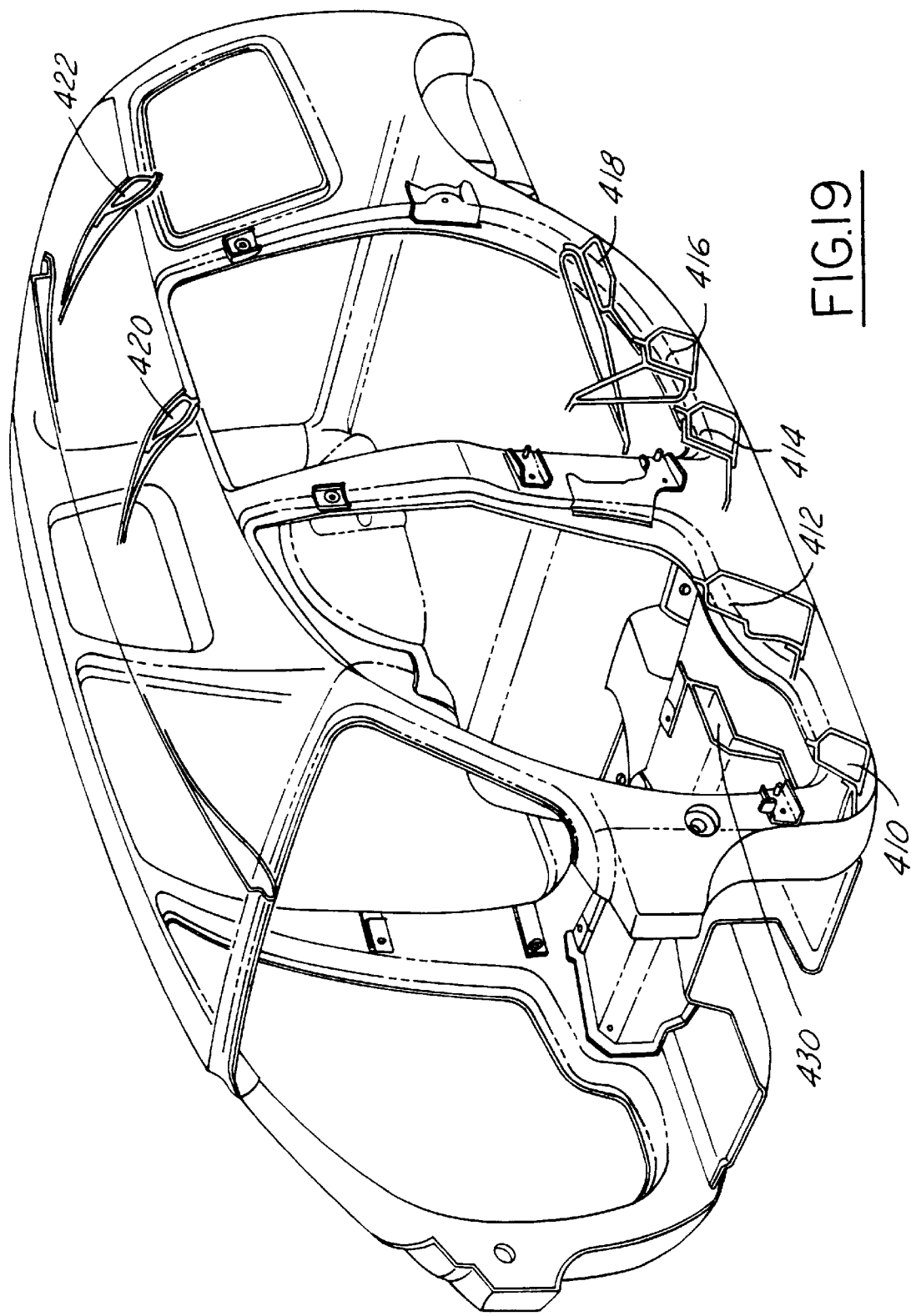

AUTOMOTIVE MULTI-PANEL COMPARTMENT AND METHOD FOR MAKING SAME

FIELD OF THE INVENTION

The present invention relates generally to automotive compartments and assembly methods therefor, and, more particularly, to a multi-panel compartment assembled at a single assembly station.

BACKGROUND OF THE INVENTION

Traditionally, a vehicle body is built along an assembly line which may have various subassembly lines, each of which adds a compartment or module to the body, such as seen in U.S. Pat. No. 5,090,105 (DeRees). Prior assembly methods are prone to tolerance stack-up, which is the addition of successive tolerances as components are added. Tolerance stack-up leads to unacceptable mating of adjacent panels and potentially to compression and tension points in the vehicle body which may add to stress induced cracks or other deficiencies.

Prior body assembly methods directed at joining metal panels have focused on welding together the adjacent panels. Welding introduces localized stress points where the panels are joined. Additionally, welding increases the tolerance stack-up due to the panels being welded in series, not at a single time or place. Metal panels are typically heavy, prone to corrosion, limited in design flexibility.

Investigations into the use of composite material panels has revealed potentially advantageous use in automotive vehicle body compartments. Composite materials consists of two or more distinctly different materials that when combined produce properties that are not achievable by the constituents acting alone. For example, reinforced plastics are composites which consist of a plastic matrix reinforced with a fibrous or non-fibrous material. Combinations of mat, woven and directional fiber materials can be used, as well as other fibers such as carbon graphite, boron, and Kelvar® (aramid). Reinforced plastics are desirable since they offer broad design flexibility and part consolidation with low tooling cost and dimensional stability. Moreso, such plastics are low in weight, high in strength, corrosion resistant, and have excellent thermal and sound properties.

Since welding is inappropriate for use with such panels, other assembly methods are necessary. In one such method, an adhesive is applied to adjoining panels which are then clamped together. Clamping, however, introduces stress to the mating parts by compressing the adhesive while it cures. When the clamp is removed, tension is introduced into the bond as the adjacent panels relax in response to removal of the clamp. In addition, clamping assembly methods increase assembly time and complexity in requiring attachment and removal of the clamps.

There is thus a need for an assembly method to assemble a vehicle body having panels adhesively bonded in a stress free, dimensional controlled environment.

SUMMARY OF THE INVENTION

The present invention overcomes the drawbacks of the related art by providing a method of constructing a vehicle body with reference to a single assembly station by movement of multiple panels into an assembled position non-clampingly fixed with an adhesive in spaced relationship without direct contact therebetween. Initially, an underbody is aligned and retained on a base of the assembly station with alignment and retention means attached to the base. A roof inner panel is then loaded onto a stationary support situated above the base, and a roof outer panel is loaded on a rear tray rotatable about an axis so as to be in covering alignment with the roof inner panel. The rear tray has an open position and a closed position. Body side panels are then placed in each of two rotatable side supports on opposite sides of the base. The side supports have a loading position and an assembling position, and are referenced to the base and the stationary support so as to place the side panels in dimensionally correct relation with the base, the roof inner panel, and the roof outer panel. A front end member is placed on a front tray longitudinally slidable with respect to the base. Adhesive is then applied to mating surfaces of the underbody, the body side panels, the roof outer panel, and the roof end member. The adhesive could be pre-applied to the panels prior to loading. A cross-member is then adhesively attached at a center section of the underbody between the side supports. The side supports are then rotatated to an assembling position so that mating surfaces on the side panels adhesively abut the underbody and the roof inner panel. The first and second body side panels are rotated so that mating flanges along the peripheries thereof are angled at between approximately 5° and 15° from a line perpendicular to the surface of the side panels. The rear tray is then rotated about the axis to a closed position so that the roof outer panel achieves an adhesively abutting relationship with the roof inner panel and the side body panels. The front tray is slid toward the base so that the front end member adhesively abuts the underbody and the side body panels. After the adhesive is cured, the assembled vehicle body is removed from the assembly station by rotating the side supports to their loading positions, rotating the rear tray to the open position, and lifting the body from the assembly station and moving it forward. The vehicle body is thus constructed by presenting a plurality of discrete body panels into assembled position with respect to a single base for application of an adhesive thereon to fix the body panels in non-clamping, spaced relationship without direct contact therebetween. The body panels comprise an underbody, a first side panel on a first side of the underbody and a second side on a second side of the underbody, a front end member mated with the underbody, the first side panel, and the second side panel, and a roof panel substantially coplanar with the underbody in mating relationship with upper mating flanges of the first and second side panels.

There is relatively little stress developed between mating panels since they are assemble at a single stage framing fixture, or assembly apparatus. Tolerance stack-up is controlled by adhesive bond gap variance between the panels. The adhesive is preferably a heavy duty urethane structural adhesive. The front end may be made of aluminum which is adhesively bonded to the underbody and the side panels. No mechanical fasteners are used to join the vehicle body panels.

An advantage of the present invention is a multi-panel compartment assembly method which reduces stress between adjacent panels.

Another advantage is a method for adhesively assembling a multi-panel compartment at a single body station which permits application of an adhesive to mating sections of the panels when in a relatively horizontal position prior to assembly to prevent adhesive drip.

Another advantage is an assembly method for a multi-panel compartment which reduces tolerance stack-up.

A feature of the present invention is a single station multi-panel compartment assembly method wherein the adjacent panels are adhesively attached without direct contact therebetween.

Another feature is an assembly method in which the bonds of mating panels of the compartment are fixed in time nearly simultaneously.

Still another feature is mating panels having adhesive wipe resistant surfaces angled between approximately 5° and 15°.

BRIEF DESCRIPTION OF THE DRAWINGS

These and other objects, advantages and features of the present invention will be apparent to those skilled in the automotive body arts upon reading the following description with reference to the accompanying drawings, in which:

FIG. 2 is a top view of a vehicle front end which fits within a tray of the body assembly apparatus for attachment to the vehicle body compartment;

FIG. 3A is a perspective top view of a vehicle body compartment underbody;

FIG. 3B is a bottom view of the underbody shown in FIG. 3A;

FIG. 8 is an exploded perspective view of body panels used to construct a vehicle compartment showing alignment devices on the panels used for aligning the panels on a single station assembly apparatus;

FIG. 8A is a perspective view of a roof outer panel alignment groove;

FIG. 9 is a perspective view of an alignment cup on the assembly station apparatus;

FIG. 10 is a side cross-sectional view of a portion of a underbody mountably aligned on the alignment cup of FIG. 16;

FIG. 11 is a perspective view, similar to FIGS. 1 and 5, showing assembly of the multi-panel compartment;

FIG. 12 is a partial perspective view of the rear tray of the assembly station apparatus;

FIG. 13 is a cross-sectional view of an assembled roof panel;

FIG. 14 is a cross-sectional view of a side panel shown connected with the roof panels and with the underbody;

FIG. 15 is a perspective view of an assembled multi-panel compartment according to the present invention;

FIGS. 16A and 16B show a schematic diagram of a prior construction having mating of flanges on adjacent surfaces which result in adhesive wipe-off;

FIGS. 17A and 17B show another schematic diagram of a prior construction having a mating flange which results in adhesive wipe-off;

FIGS. 18A and 18B show a schematic diagram of mating flanges on adjacent surfaces according to the present invention which reduces adhesive wipe-off; and FIG. 19 is a perspective view of a body compartment, without the front end member, assembled on a single station assembly apparatus showing cut-away views of body panel flange joints arranged to reduce adhesive wipe-off.

DETAILED DESCRIPTION OF THE PREFERRED EMBODIMENTS

Figure 1:
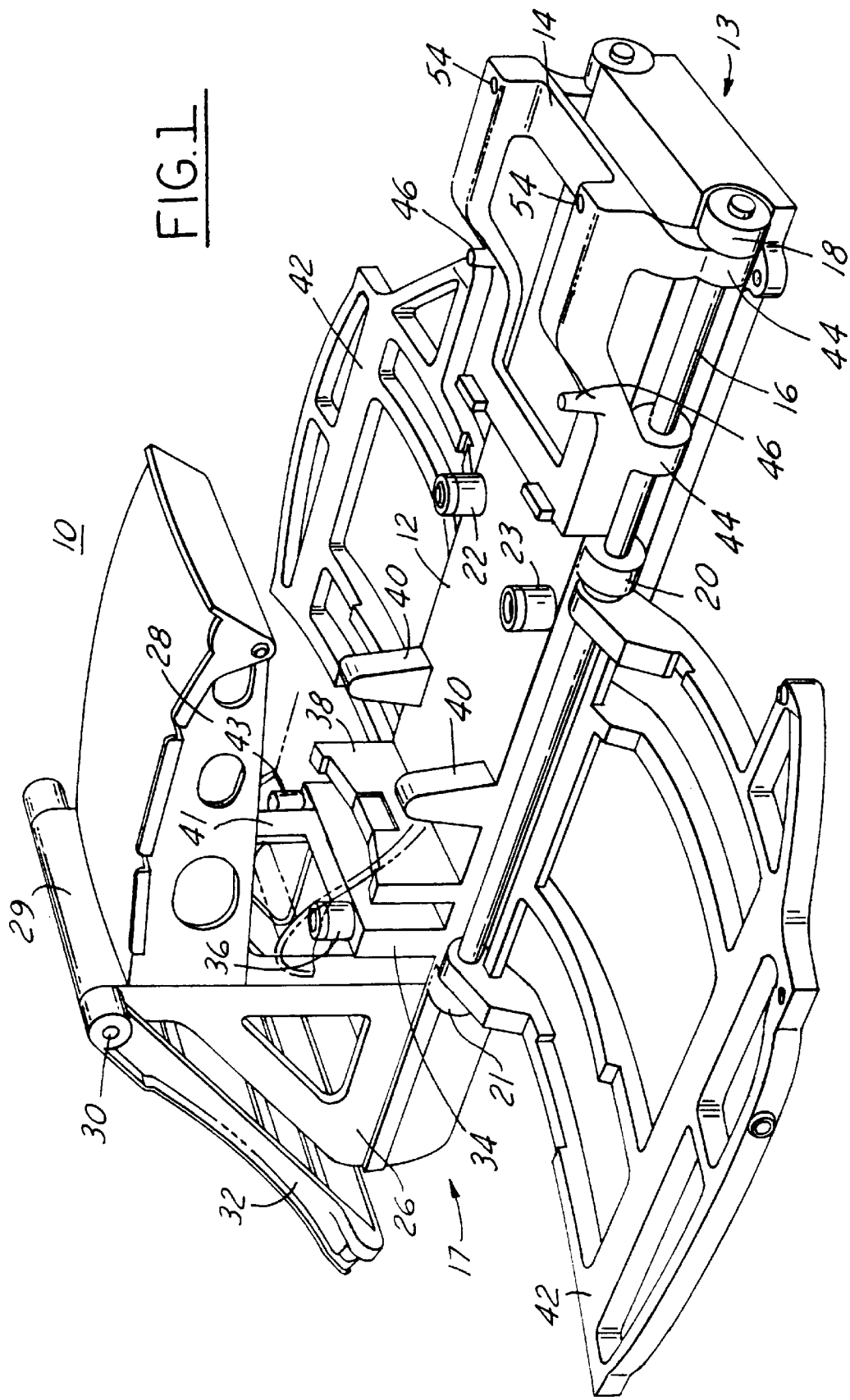
FIG. 1 is a perspective view of a multi-panel body assembly apparatus for assembling a vehicle compartment according to the present invention.

Referring now to the drawings, and in particular to FIG. 1 thereof, a multi-panel compartment assembly station apparatus 10 is shown. The assembly station apparatus 10 has a base 12 onto which various panel mounting and aligning features are attached. Beginning with front of the assembly station apparatus 10, generally indicated at 13, which is at the right in FIG. 1, a front tray 14 is slidably disposed on a pair of longitudinally extending rails 16. The rails 16 extend from the front 13 to the rear thereof generally indicated at 17, and are mounted in a front boss 18, a rear boss 21, and a center boss 20. Extending upwardly from a front lateral area of the base 12 are a pair of underbody front alignment and retention cups 22, 23 described in more detail below. At the rear section of the base 12 is a support bracket 26 having triangular shaped sides with a shelf 28 cantileverly extending therefrom toward the front of the base 12. At the top 29 of the bracket 26 is an axle 30 running transversely with respect to the base 12 and upon which a rear tray 32 is rotatably mounted. Just forward of the bracket 26 is a wall 34 having a pair of underbody rear alignment and retention cups 36 thereon. Forward of the wall 34 is a pedestal 38 upon which a portion of the suspension 39 rests. The suspension 39 is best seen in FIG. 2. Forward of the pedestal 38 are a pair of lateral posts 40, also for supporting the suspension 39. A lever 41 mounted on a rear lateral area of the base 12 positions an underbody 56 (FIGS. 3A and 3B) laterally against an upwardly extending tab 43 on the base 12. Preferably, the lever is spring loaded, or alternatively, hydraulically or pneumatically operated. The underbody 56 is thus aligned in three dimensions on the base 12 by the alignment and retention cups 22, 23, and 36, and by the lever 41 and the tab 43.

Still referring to FIG. 1, a pair of side supports 42 are mounted on opposite sides of the base 12 between the center boss 20 and rear boss 21 of the rail 16 for rotational movement around the longitudinal axis thereof. The front tray 14 is slidably mounted to the rails 16 on both sides, with a pair of front tray bosses 14 which slide between the center boss 20 and the front boss 18. The front tray 14 has upwardly extending knobs 46 for engagement with suspension receiving openings 48 on opposite sides of a front member 50 (FIG. 2). The front tray 14 also has a pair of keys 52 at a rear portion thereof, and a pair of orifices 54 on a front portion thereof, for properly aligning the front member 50 on the front tray 14.

The front end member 50, as seen in FIG. 2, has a pair of sides 76, a radiator supports 78, and a passenger compartment wall 80, collectively defining therebetween an engine compartment 82. A pair of support members 84 extend from the passenger compartment wall 80 to the radiator support 78 through the engine compartment 82 area. A transmission conduit 86 extends rearwardly from the passenger compartment wall 80, which, for purposes of FIG. 2, is to the left. The transmission conduit 86 mates with a flared section of the transmission and driveshaft duct 62 of the underbody 56 (FIGS. 2 and 3A). Flanges 88 along the lateral outer portion of the passenger compartment wall 80 mate with the flanges 66 of the underbody 56.

Turning now to FIG. 3A, the underbody 56 is seen having a pair of wheel wells 58 on opposite sides at a rear portion 59, a transverse section 60, a transmission and driveshaft duct 62, and a pair of foot platforms 64 on opposite sides at a forward section generally indicated at 65. Around the periphery of the underbody 56 is an upwardly turned flange 66 extending around essentially the entire periphery of the underbody 56. As discussed further below, the flange 66 mates with flanges on adjoining panels, including the side panels 104 and the front member 50 (FIG. 2).

On the bottom of the underbody 56, as seen in FIG. 3B, the foot platforms 64 have embossed, semi-sinusoidal teeth 68 for engagement with teeth receiving embossments 70 on an underside of a rear section 71 of the front member 56, as seen in dotted line in FIG. 2. A recess 74 located on one of the foot platforms 64 engages with the alignment cup 22, as further described below with respect to FIG. 14.

Figure 4A:
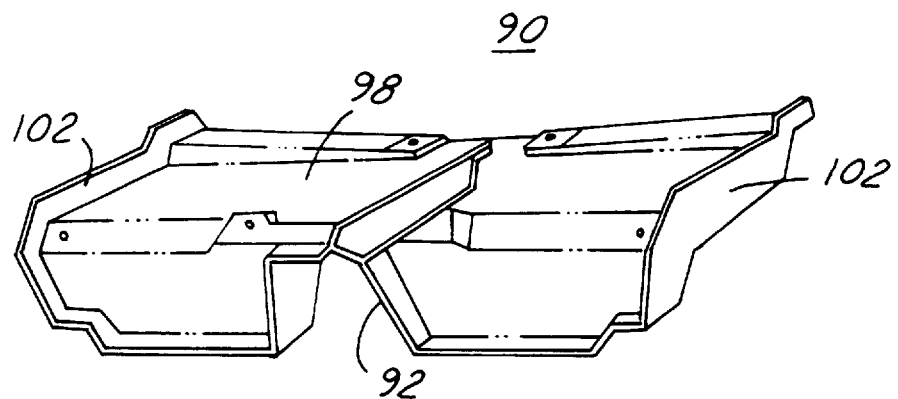
FIG. 4A is a perspective view of a side cross support member.
Figure 4B:
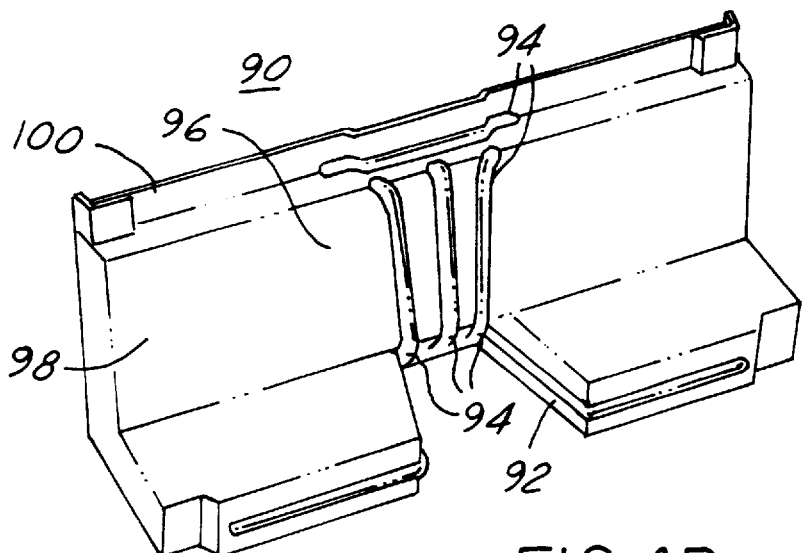
FIG. 4B is a bottom view of the support member of FIG. 4A, shown with adhesive attached thereof.

Referring now to FIGS. 4A and 4B, a body cross-support member 90 is shown which mounts over the transmission and driveshaft duct 62 via an arch 92. Adhesive 94 placed on a flange along the arch 92, and along a center section of a top panel 98 of the cross-support member 90, as well as on a rear under flange 100, attaches the cross-support member 90 to the underbody 56. A flange 102 along the outer periphery of the cross-support member 90 mates with the body side panels 104.

Figure 5:
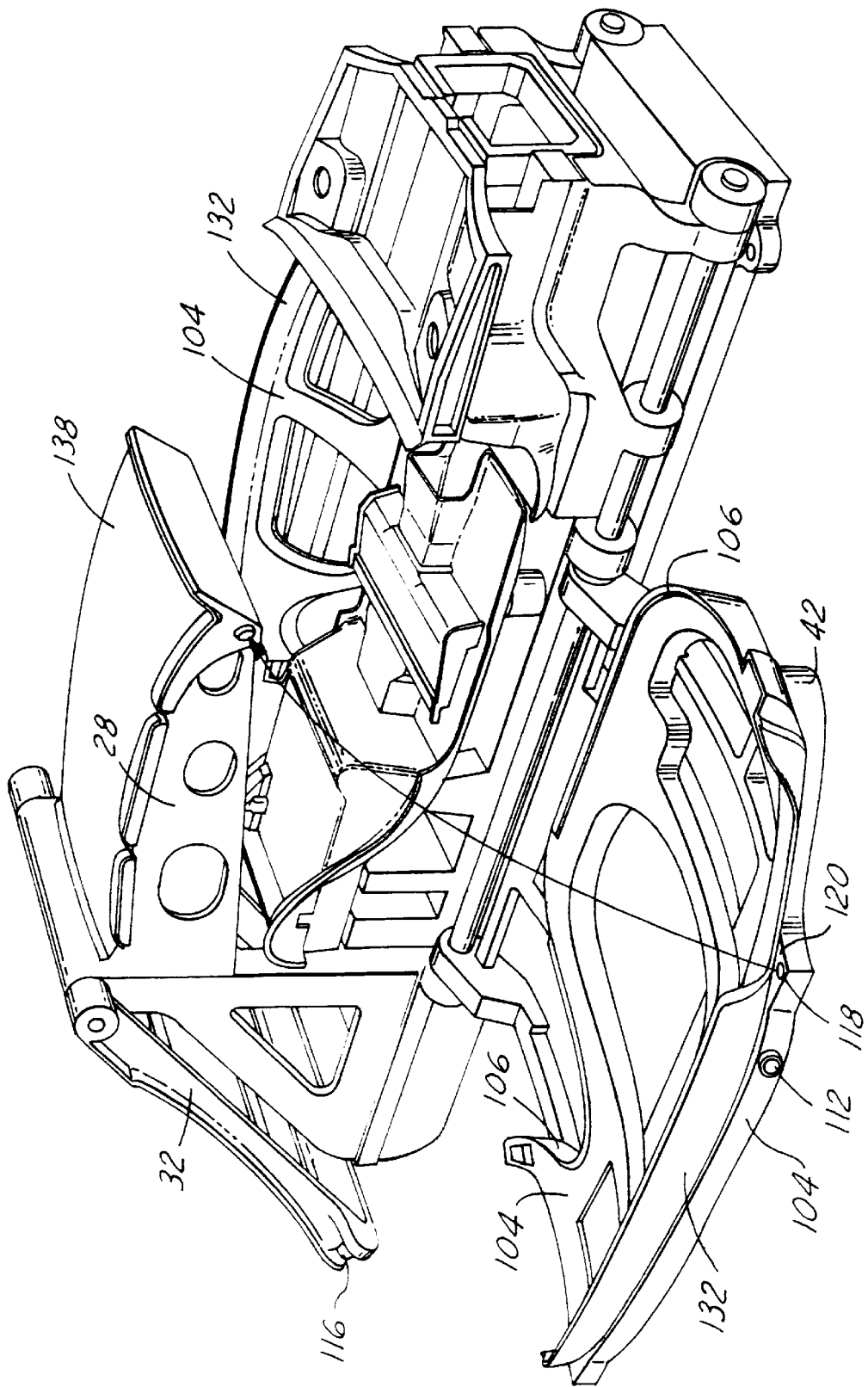
FIG. 5 is a view similar to FIG. 1, but showing the underbody, the roof inner panel, the roof outer panel, the body side panels, and the front end member appropriately placed on the assembly station apparatus according to the present invention.
Figure 6:
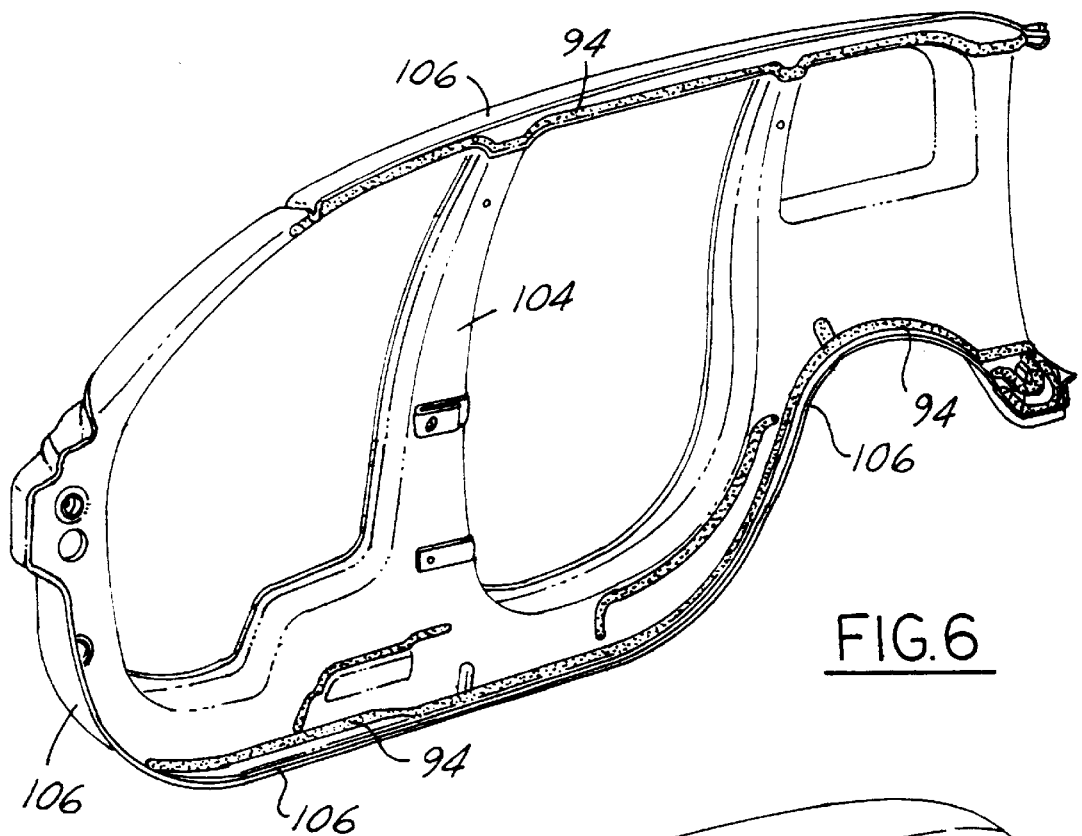
FIG. 6 is an inner view of a body side panel showing adhesive application locations thereon.

As seen in FIG. 5, a pair of body side panels 104 fit on the side supports 42 in a generally horizontal position prior to connection with other body components on the assembly apparatus 10. The body side panels have inwardly extending mating flanges 106 on the periphery thereof, which receive an adhesive 94 thereon, as best seen in FIG. 6. The side support 42 has a cup 112 on an upper edge 114 thereof for mating with a knob 116 in the rear tray 32. A recess 118 in a forward surface 120 of the side support 42 mates with a knob 122 on the cantilevered shelf 28 for maintaining alignment during assembly.

Figure 7:
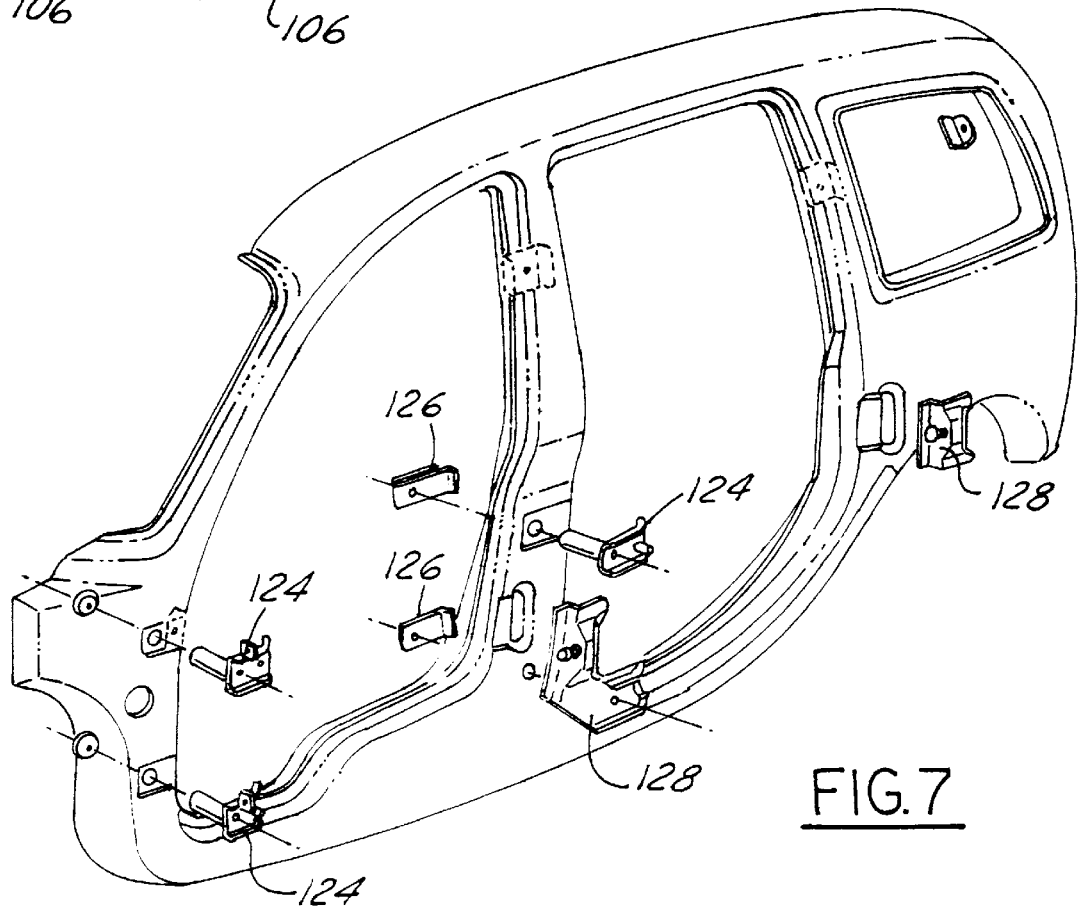
FIG. 7 is a side perspective view of a body side panel showing attachment of hardware thereto in exploded view.

Body hardware is placed onto the body side supports 42 by placement over pins (not shown) projecting from an inner surface thereof and can be held in place with magnets (not shown) on an outer surface of the body side supports 42. For example, the vehicle door hinges 124 would be placed on the body side supports 42, the body side panels 104 would be placed thereover, and the brackets 126 and striker plates 128 then would be attached at appropriate locations on the body side panels 104. In this way, most, if not all components are fixed at one time so that tolerance stack-up is reduced. Locational placement of the door hinges 124, the brackets 126, and the striker plates 128 are shown in FIG. 7.

The aforementioned panels have alignment features, as shown in FIG. 8, which assist in properly aligning the panels on the assembly station 10. The roof outer panel 130 has a pair of liftgate bracket notches 230 along a rear edge 232 which are used for horizontal alignment, that is, fore-aft and lateral alignment. The notches 230 (FIG. 8) fit into mating knobs (not shown) on the rear tray 32 (FIG. 5). A groove along a front edge 242 of the roof outer panel 130 has a wedge 244 (FIG. 8A) which is biased against an external stop 246 by an external force, such as a spring loaded alignment tool, for proper lateral alignment of the front of the roof outer panel 130. Alignment of the body side panels 104 on the side supports 42 is accomplished by a recess 250 at a forward portion 252 of the side panel 104 which receives a knob 254 (FIG. 1) on an inner surface of the side supports 42.

Turning now to FIG. 9, an alignment and retention cup 22 having a three-pronged member 146 thereon provides positive alignment for placement of the underbody 56 on the base 12. The three-pronged member 146 fits within a recess 74 in the bottom surface 148 of the underbody 56 (FIGS. 3B and 10). An annular seal 150 surrounds a cylinder portion 152 of the alignment cup 22 to provide a vacuum retention force to maintain the underbody 56 in a fixed position relative to the base 12. As the underbody 56 is lowered onto the base 12 and aligned with the alignment and retention cup 22, the bottom surface 148 of the underbody 56 deflects the annular seal 150 slightly, and a vacuum is created in a chamber 154 between the underbody bottom surface 148 and the alignment and retention cup 22 (FIG. 10). The alignment and retention cups 23, 36 preferably do not have the three-pronged alignment member 146, but primarily position the underbody 56 in a vertical direction only.

As seen in FIG. 11, the side supports 42 are rotated around the longitudinal axis of the reference rails 16 so that the body side panels 104 mate with the underbody 56. The rear tray 32 is rotated about axle 30 to place the roof outer panel 130 in mating contact with a rail outer surface 132 of the body side panels 104 (FIGS. 5, and 11–13). As seen in FIG. 13, edge portions of the roof outer panel 130 fit over the body side flanges 13. Lateral portions 136 of the roof inner panel 138 likewise fit underneath and mate with the body side flanges. Along the lower edge of the body side panel 104, as better seen in FIG. 14, the flange 106 is angled from the base 12, which substantially corresponds to a horizontal plane 140, at an angle α between approximately 5° and 15°, and preferably approximately 10°. The angle of the flange 106 from the horizontal is important since the adhesive 94 applied thereto may flow or drip therefrom, or run off the flange 106, during the cure time after the body side panel 104 have been rotated into position as described above. An assembled vehicle compartment 142 is shown in FIG. 15. The assembled position is that position when a component, or member, is adhesively mated to at least one other component or member of the multi-panel compartment.

Preferably, all mating flanges for adjacent panels of the present invention, including flanges 106, 134, and 136, are angled at approximately between 5° and 15°, preferably approximately 10°, from a line perpendicular to the mating surfaces (FIG. 14) to prevent adhesive wipe-off. Flanges angled at less than approximately 5° from a line perpendicular to the surface result in the adhesive wipe-off problem. Flanges angled at more than approximately 15° from a line perpendicular to the surface result in unpredictable adhesive distribution, and may not provide sufficient retention between adjacent surfaces.

The adhesive wipe-off problem is demonstrated in FIGS. 16A–B and 17A–B. In the prior panel mating method depicted in FIG. 16A, adjacent mating surfaces S1 and S2 have flanges F1 and F2, respectively, angled at 90° from the surfaces S1 and S2. A bead 310 of adhesive is placed in the bend 312 of the surface S1 and movement of the surface S2 into engagement with the surface S1 results in an uneven distribution of adhesive on opposite sides of the bend 312. For example, the flange F1 and the surface S2 may be left with no adhesive thereon (FIG. 16B). Likewise, in FIGS. 17A–B, movement of the surface S2 into the bend 314 of surface S1 may result in the flange F1 having little or no adhesive thereon. Such a bond will not adequately hold the surfaces S1 and S2 together.

In contrast, mating panels of the present invention have wipe resistant surfaces, or flanges, angled between approximately 5° and 15°, and preferably angled at approximately 10° to a line perpendicular to the surface from which its extends. Referring to FIG. 18A, a surface S1 has a flange F1 extending at an angle α, approximately 10°, from a line L1 perpendicular to the surface thereof, and a mating surface S2 has a flange F2 likewise bent at an angle α, also approximately 10°, from the surface thereof. A bead 320 of adhesive is placed in the bend 322 of surface S1 so that movement of surface S2 into a mating position with surface S1 will result in an even distribution of adhesive on either side of the bend 320 (FIG. 18B). Preferably, the panels are angled so that the included angle β is greater than 90°.

Construction of the multi-panel compartment is accomplished as follows. The underbody 56 is placed on base 12 of the assembly station 10 (FIG. 11), either manually, robotically, or a combination of both. As discussed above, the underbody 56 is aligned on base 12 with the alignment and retention cups 22, 23, 36, and the lever 41 and tab 43. The alignment and retention cup 22 aligns the underbody 56 vertically, transversely, and longitudinally, that is, in three dimensions. The alignment and retention cups 23 align the underbody 56 in a vertical direction only. The lever 41 is then moved toward the tab 43 to transversely position the rear end of the underbody 56. Suspension 39 and other components, such as tension strut brackets (not shown), are placed on base 12 before the underbody 56 is loaded thereon.

The roof inner panel 138 is then loaded onto the stationary support 28 situated above base 12 (FIG. 11), and the roof outer panel 130 is loaded onto the rear tray 32 (FIG. 15). Body hardware, such as that described above, is attached as described above. Body side panels 104 are then loaded on each of the rotatable side supports 42 on opposite sides of the base 12. The front end member 50 is then placed on the front tray 14, which is longitudinally slidable with respect to base 12. It is not necessary that the underbody 56, the roof inner panel 138, the roof outer panel 130, the body side panel 104, or the front end member 50 be loaded or placed onto the assembly station in the order just described. That is, the panels of the multi-panel compartment can be loaded simultaneously or in any convenient order. Assembly of the multi-panel compartment is not contingent upon the order of placement of the separate panels onto the assembly station 10. The cross-support member 90 is placed on an upper surface of the underbody 56 with the arch 92 positioned over the transmission and driveshaft duct 62 (FIGS. 8 and 11), with adhesive 94 appropriately placed as described above.

Adhesive 94 is applied to mating surfaces of the underbody 56, the body side panels 104 (FIG. 12), the roof outer panel 130, and the front end member, as previously described. Preferably, a durable, non-brittle, urethane adhesive is used which may be robotically applied to the mating surfaces.

The side supports 42 are then rotated to an assembling position (FIGS. 5 and 11) so that mating flanges 106, 132 on the side panels 104 adhesively abut the underbody 56 and the roof inner panel 138. The rear tray 32 is next rotated about the axle 30 to a closed position (FIG. 11) so that the roof outer panel 130 achieves an adhesively abutting relationship with the roof inner panel 138 and the side body panels 104 (FIGS. 13 and 14). The front tray 14 is slid toward the base 12 so that the front end member 50 adhesively abuts the underbody 56 and the side body panels 104. Curing of the adhesive 94 is preferably facilitated by application of heat to the exposed surfaces thereof to hasten the process. The intensity and duration of heat applied will vary with the type of adhesive, thickness of the layer of adhesive applied, and surface of adhesive exposed to the heat, as well as other factors known to those skilled in the art and suggested by this disclosure.

The assembled vehicle compartment is removed from the assembly station 10 by rotating the rear tray 32 to open position, rotating the body side supports 42 to the loading positions, sliding the front tray 14 away from the vehicle body 142, and lifting up and moving forward the vehicle body. An assembled vehicle body is shown in FIG. 15.

As seen in FIGS. 10 and 11, the roof inner panel 138 and the roof outer panel 130, which combine to form a roof panel unit, have mating flanges 136, 134, respectively, on edges thereof, which mate on an upper surface and a lower surface, respectively, to the upper side panel mating flange 132. FIG. 19 shows joints 410, 412, 414, 416 and 418 of the body side panel 104 and floor member 56 on an assembled vehicle body having the advantageous flange mating construction as described above. Also shown in FIG. 19 are roof panel/side body penal joints 420 and 422, as well as a joint 430 between the cross-member 90 and the floor member 56.

Although the preferred embodiment of the present invention has been disclosed, various changes and modifications may be made without departing from the scope of the invention as set forth in the appended claims.

We claim:

1. A method of assembling a multi-panel compartment at a single assembly station by mounting body panels with respect to a single base for movement into an assembled position adhesively fixed in spaced relationship without direct contact therebetween, the method comprising the steps of:

locating an underbody on a base of the assembly station, positioning a roof panel above said panel, placing a first body side panel proximate a first side of the base and a second body side panel proximate a second side of said base, and placing a front end member in front of the base;

applying adhesive to mating surfaces of said underbody, said first and second body side panels, said roof inner panel, and said front end member;

rotating the first and second body side panels so that mating surfaces thereof adhesively abut the underbody and the roof inner panel without direct contact therebetween; and sliding said front end member toward said base so as to adhesively abut said underbody and said first and second body side panels without direct contact therebetween.

2. A method according to claim 1, and further including the step of attaching hardware to said body side panels before placing said body side panels proximate said base.

3. A method according to claim 1, and further including the step of applying the adhesive robotically to said mating surfaces of said underbody, said first and second body side panels, said roof panel, aid said front end member.

4. A method according to claim 1, and further including the steps of lifting and removing said vehicle body from said assembly station.

5. A method according to claim 1 wherein mating flanges of said body side panels, said roof outer panel, and said underbody are moved into mating contact with adhesive therebetween so as to reduce adhesive wipe-off on adjacent surfaces.

6. A method according to claim 1 and further including the step of retaining the underbody to the base with means for retaining attached on the base.

7. A method of constructing a vehicle body with reference to a single assembly station by movement of multiple panels into an assembled position non-clampingly fixed with an adhesive in spaced relationship without direct contact therebetween, the method comprising the steps of:

aligning and retaining an underbody on a base of the assembly station with alignment and retention means attached to the base;

loading a roof inner panel on a stationary support situated above the base;

loading a roof outer panel on a rear tray rotatable about an axis so as to cover the roof inner panel, the rear tray being in an open position;

placing a body side panel in each of two rotatable side supports on opposite sides of the base, the side supports in a loading position;

placing a front end member on a front tray longitudinally slidable with respect to the base;

applying the adhesive to mating surfaces of the underbody, the body side panel in each of the side supports, the roof outer panel, and the roof end member;

positioning a cross-support member onto the underbody so that a mating surface of the cross-support member is engageable with the body side panels in each of the side supports when moved to an assembling position;

rotating the side supports to the assembling position so that mating surfaces on the side panels adhesively abut the underbody and the roof inner panel;

rotating the rear tray about the axis to a closed position so that the roof outer panel achieves an adhesively abutting relationship with the roof inner panel and the body side panels in each of the side supports;

sliding the front tray toward the base so that the front end member adhesively abuts the underbody and the body side panels in each of the side supports; and curing the adhesive.

8. A method according to claim 7, and further including the step of placing hardware onto the rotatable side supports before positioning the body side panels thereon.

9. A method according to claim 7, wherein the adhesive is robotically applied to the mating surfaces of the underbody, the body side panel in each of the side supports, the roof outer panel, and the front end member.

10. A method according to claim 7, and further including the step of removing the vehicle body from the assembly station by:

rotating the rear tray to the open position and rotating the body side supports to the loading positions;

sliding the front tray away from the vehicle body; and lifting up and moving forward the vehicle body.

11. A method according to claim 7 wherein mating flanges of said body side panels, said roof outer panel, and said underbody are moved into mating contact with adhesive therebetween so as to reduce adhesive wipe-off on adjacent surfaces.

12. A method of constructing a vehicle body with reference to a single assembly station by movement of multiple panels into an assembled position fixed with an adhesive in spaced relationship without direct contact therebetween, the method comprising the steps of:

aligning and retaining an underbody on a base of the assembly station;

loading a roof inner panel on a support situated above the base;

loading a roof outer panel on a rear tray rotatable about an axis so as to cover the roof inner panel;

placing a body side panel in each of two rotatable side supports on opposite sides of the base;

placing a front end member on a front tray longitudinally slidable with respect to the base;

applying the adhesive to mating surfaces of the underbody, the body side panel in each of the side supports, the roof outer panel, and the roof end member;

rotating the side supports to an assembling position so that mating surfaces on the side panels adhesively abut the underbody and the roof inner panel;

rotating the rear tray about the axis to a closed position so that the roof outer panel achieves an adhesively abutting relationship with the roof inner panel and the body side panels in each of the side supports; and sliding the front tray toward the base so that the front end member adhesively abuts the underbody and the body side panels in each of the side supports.

13. A method according to claim 12, and further including the step of curing the adhesive.

14. A method according to claim 12, and further including the step of placing hardware onto the rotatable side supports before positioning the body side panels therein.

15. A method according to claim 12, wherein the adhesive is robotically applied to the mating surfaces of the underbody, the side body panels, the roof outer panel, and the front end member.

16. A method according to claim 12, and further including the step of removing the vehicle body from the assembly station by:

rotating the rear tray to the open position and rotating the body side supports to the loading positions;

sliding the front tray away from the vehicle body; and lifting up and moving forward the vehicle body.

17. A method according to claim 12 wherein mating flanges of said body side panels, said roof outer panel, and said underbody are moved into mating contact with adhesive therebetween so as to reduce adhesive wipe-off on adjacent surfaces.

\* \* \* \* \*